(12) United States Patent
Shiro (10) Patent No.: US 10,532,950 B2
(45) Date of Patent: Jan. 14, 2020

(54) CUBIC BORON NITRIDE SINTERED BODY AND COATED CUBIC BORON NITRIDE SINTERED BODY

(71) Applicant: TUNGALOY CORPORATION, Yoshima-Kogyodanchi, Iwaki-shi (JP)

(72) Inventor: Kentaro Shiro, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 339 days.

(21) Appl. No.: 15/518,623

(22) PCT Filed: Oct. 29, 2015

(86) PCT No.: PCT/JP2015/080487
§ 371 (c)(1),
(2) Date: Apr. 12, 2017

(87) PCT Pub. No.: WO2016/068222
PCT Pub. Date: May 6, 2016

(65) Prior Publication Data
US 2017/0233296 A1 Aug. 17, 2017

(30) Foreign Application Priority Data
Oct. 29, 2014 (JP) .................. 2014-220154

(51) Int. Cl.
*B22F 3/00* (2006.01)
*C04B 35/5831* (2006.01)
(Continued)

(52) U.S. Cl.
CPC .......... *C04B 35/5831* (2013.01); *B23B 27/14* (2013.01); *B23B 27/148* (2013.01);
(Continued)

(58) Field of Classification Search
None
See application file for complete search history.

(56) References Cited

U.S. PATENT DOCUMENTS

2008/0075543 A1 3/2008 Zhu et al.
2010/0313489 A1 12/2010 Teramoto et al.
(Continued)

FOREIGN PATENT DOCUMENTS

JP 2011-189421 A 9/2011
WO WO 2012/057183 A1 5/2012

OTHER PUBLICATIONS

International Search Report dated Jan. 19, 2016 issued in International (PCT) Application (No. PCT/JP2015/080487).
(Continued)

*Primary Examiner* — Seth Dumbris
(74) *Attorney, Agent, or Firm* — Foley & Lardner LLP (57) ABSTRACT

A cubic boron nitride sintered body has between 50% and 75% cubic boron nitride by volume and between 25% and 50% binder phase by volume, and inevitable impurities. The binder phase contains an Al compound and a Zr compound. The Al compound contains Al and one or more of N, O and B; and the Zr compound contains Zr and one or more of C, N, O and B. At a polished surface of the cubic boron nitride sintered body, 40% or more of the Zr compounds satisfy the ratio $0.25 \leq n/N \leq 0.8$, where: N represents the number of line segments drawn radially at equal intervals from a center of gravity of a given Zr compound to a boundary with a non-Zr compound; and n represents the number among those N line segments which intersect a boundary between the given Zr compound and cubic boron nitride.

9 Claims, 1 Drawing Sheet

(51) Int. Cl.
  *B23B 27/14* (2006.01)
  *B23B 27/20* (2006.01)
  *C04B 41/87* (2006.01)
  *C04B 41/89* (2006.01)
  *C04B 35/626* (2006.01)
  *C04B 35/63* (2006.01)
  *C04B 35/64* (2006.01)
  *C04B 41/00* (2006.01)
  *C04B 41/50* (2006.01)
  *C04B 41/52* (2006.01)
  *C04B 35/645* (2006.01)

(52) U.S. Cl.
  CPC .......... *B23B 27/20* (2013.01); *C04B 35/6261* (2013.01); *C04B 35/6262* (2013.01); *C04B 35/6264* (2013.01); *C04B 35/62615* (2013.01); *C04B 35/62685* (2013.01); *C04B 35/6303* (2013.01); *C04B 35/64* (2013.01); *C04B 35/645* (2013.01); *C04B 41/009* (2013.01); *C04B 41/5068* (2013.01); *C04B 41/52* (2013.01); *C04B 41/87* (2013.01); *C04B 41/89* (2013.01); *B23B 2224/04* (2013.01); *B23B 2226/125* (2013.01); *B23B 2228/105* (2013.01); *C04B 2235/3217* (2013.01); *C04B 2235/3225* (2013.01); *C04B 2235/3246* (2013.01); *C04B 2235/3804* (2013.01); *C04B 2235/386* (2013.01); *C04B 2235/3813* (2013.01); *C04B 2235/3839* (2013.01); *C04B 2235/3865* (2013.01); *C04B 2235/3886* (2013.01); *C04B 2235/402* (2013.01); *C04B 2235/549* (2013.01); *C04B 2235/5436* (2013.01); *C04B 2235/5445* (2013.01); *C04B 2235/5454* (2013.01); *C04B 2235/656* (2013.01); *C04B 2235/6567* (2013.01); *C04B 2235/6581* (2013.01); *C04B 2235/661* (2013.01); *C04B 2235/785* (2013.01); *C04B 2235/786* (2013.01); *C04B 2235/80* (2013.01); *C04B 2235/96* (2013.01); *Y10T 428/12049* (2015.01)

(56) References Cited

U.S. PATENT DOCUMENTS

| | | |
|---|---|---|
| 2012/0208006 A1 | 8/2012 | Okamura et al. |
| 2012/0304544 A1 | 12/2012 | Yokoshi |
| 2013/0000213 A1 | 1/2013 | Okamura et al. |
| 2013/0079215 A1 | 3/2013 | Okamura et al. |

OTHER PUBLICATIONS

Written Opinion dated Jan. 19, 2016 issued in International (PCT) Application (No. PCT/JP2015/080487).
Extended European Search Report dated May 17, 2018 in corresponding application No. 15856133.2.
European Office Action dated Mar. 14, 2019 in corresponding application No. 15856133.2.
Sung et al, Remote-plasma chemical vapor deposition of conformal ZrB2 films at low temperature: A promising diffusion barrier for ultralarge scale integrated electronics, J. or Applied Physics, vol. 91, No. 6, 2002, pp. 3904-3911.

CUBIC BORON NITRIDE SINTERED BODY AND COATED CUBIC BORON NITRIDE SINTERED BODY

RELATED APPLICATIONS

This is a 371 US National Phase of International Patent Application No. PCT/JP2015/080487 filed Oct. 29, 2015, which published as WO2016/068222A1 on May 6, 2016, and which claims priority to JP 2014-220154, filed Oct. 29, 2014. The contents of the aforementioned applications are incorporated by reference in their entirety.

TECHNICAL FIELD

The present invention relates to a cubic boron nitride sintered body and a coated cubic boron nitride sintered body. More specifically, the present invention relates to a cubic boron nitride sintered body and a coated cubic boron nitride sintered body suitable for a cutting tool and a wear resistant tool.

BACKGROUND ART

The cubic boron nitride has a hardness next to the diamond and excellent thermal conductivity. In addition, the cubic boron nitride has a characteristic that it has low affinity with iron. A cubic boron nitride sintered body comprising cubic boron nitride and a binder phase of a metal(s) or ceramics is applied to a cutting tool or a wear resistant tool, etc.

For example, the conventional cubic boron nitride sintered body comprises 20% by volume or more and 60% by volume or less of cubic boron nitride, and at least $Al_2O_3$ and a Zr compound in a binder phase (see Patent Document 1).

PRIOR ART DOCUMENT

Patent Document

Patent Document 1: WO2012/029440A

SUMMARY OF THE INVENTION

Problems to be Solved by the Invention

In recent years, more severe cutting conditions than before are imposed on a cutting tool or a wear resistant tool to increase machining efficiency, and further, tool life is required to be longer. However, the cubic boron nitride sintered body of Patent Document 1 is not suitable for a tool for processing a difficult-to-cut material having a low thermal conductivity, and cannot satisfy the requirement concerning the tool life. That is, the cubic boron nitride sintered body of Patent Document 1 contains $Al_2O_3$ and a Zr compound, and has a constitution that cubic boron nitride grains and $Al_2O_3$ grains are bound, and the Zr compound is dispersed in $Al_2O_3$. Thermal conductivity of the Zr compound is low. Therefore, the cubic boron nitride sintered body of Patent Document 1 involves the problem that the blade edge is easily fractured when it is applied to a tool for processing a difficult-to-cut material having a low thermal conductivity, for example, a nickel-based heat resistant alloy or a cobalt-based heat resistant alloy, etc.

The present invention has been done to solve the above-mentioned problem, and an object thereof is to provide a cubic boron nitride sintered body and a coated cubic boron nitride sintered body which are excellent in fracture resistance, and capable of elongating a tool life of a cutting tool or a wear resistant tool.

Means to Solve the Problems

The present inventor has earnestly studied on the cubic boron nitride sintered body. As a result, the present inventor has elucidated the cause that the conventional cubic boron nitride sintered body has likely fractured. That is, heat generated by cutting the difficult-to-cut material is caught in the Zr compound having a low thermal conductivity. Accordingly, a cutting temperature becomes high. High cutting temperature promotes chemical reaction wear of the cubic boron nitride sintered body. Chemical reaction wear lowers strength at the blade edge of the tool to cause fracture of the blade edge. The present inventor obtained the finding that fracture resistance of the cubic boron nitride sintered body can be improved by suppressing chemical reaction wear. Further, the present inventor has obtained a finding that it is effective to improve thermal conductivity of a cubic boron nitride sintered body without lowering oxidation resistance of the cubic boron nitride sintered body for suppressing chemical reaction wear. The present inventor has completed the present invention based on these findings.

The summary of the present invention is as follows.
(1) A cubic boron nitride sintered body which comprises 50% by volume or more and 75% by volume or less of a cubic boron nitride, and 25% by volume or more and 50% by volume or less of a binder phase and inevitable impurities, wherein, the binder phase contains an Al compound and a Zr compound, the Al compound contains an Al element, and at least one element selected from the group consisting of N, O and B, the Zr compound contains a Zr element, and at least one element selected from the group consisting of C, N, O and B, at a polished surface of the cubic boron nitride sintered body, when a number of a plurality of line segments drawn radially at equal intervals from a center of gravity of the Zr compound to a boundary of the Zr compound and a portion of a composition other than the Zr compound is made N (provided that N is 8 or more), and among the line segments, at the boundary of the Zr compound and the portion of a composition other than the Zr compound, a number of the line segments contacting with the cubic boron nitride is made n, then a number of the Zr compound satisfying a relation of n/N being 0.25 or more and 0.8 or less is 40% or more based on a total number of the Zr compound.
(2) The cubic boron nitride sintered body of (1), wherein the Zr compound is 1% by volume or more and 4% by volume or less based on the whole cubic boron nitride sintered body.
(3) The cubic boron nitride sintered body of (1) or (2), wherein an average grain size of the cubic boron nitride is 0.2 μm or more and 0.8 μm or less.
(4) The cubic boron nitride sintered body of any one of (1) to (3), wherein the Zr compound contains $ZrB_2$ and $ZrO_2$, a crystal structure of the $ZrO_2$ is formed in a state of tetragonal, or both of tetragonal and cubic being intermixed, when a peak intensity at a (100) plane of the $ZrB_2$ is made $I_1$, a peak intensity at a (101) plane of the tetragonal $ZrO_2$ is made $I_{2t}$, and a peak intensity at a (111) plane of the cubic $ZrO_2$ is made $I_{2c}$ in X-ray diffraction, a ratio $[I_1/(I_{2t}+I_{2c})]$ of an intensity of $I_1$ based on a sum of intensities of $I_{2t}$ and $I_{2c}$ is 0.5 or more and 5 or less.
(5) The cubic boron nitride sintered body of any one of (1) to (4), wherein the Al compound comprises $Al_2O_3$.
(6) A coated cubic boron nitride sintered body which comprises a film formed onto a surface of the cubic boron nitride sintered body of any one of (1) to (5).
(7) The coated cubic boron nitride sintered body of (6), wherein the film comprises at least one element selected from the group consisting of Ti, Zr, Hf, V, Nb, Ta, Cr, Mo, W, Al and Si, and at least one element selected from the group consisting of C, N, O and B.
(8) The coated cubic boron nitride sintered body of (6) or (7), wherein the film is a monolayer film or a laminated film of two or more layers.
(9) The coated cubic boron nitride sintered body of any one of (6) to (8), wherein an average film thickness of a whole film is 0.5 μm or more and 20 μm or less.

Effects of the Invention

According to the present invention, a cubic boron nitride sintered body and a coated cubic boron nitride sintered body excellent in fracture resistance can be realized. Accordingly, a cutting tool or a wear resistant tool to which the cubic boron nitride sintered body or the coated cubic boron nitride sintered body of the present invention has been applied is elongated in its tool life.

EMBODIMENTS TO CARRY OUT THE INVENTION

The cubic boron nitride sintered body in this embodiment comprises 50% by volume or more and 75% by volume or less of a cubic boron nitride, and 25% by volume or more and 50% by volume or less of a binder phase and inevitable impurities. Such a cubic boron nitride sintered body is applied, for example, to a cutting tool or a wear resistant tool. Here, if the cubic boron nitride contained in the cubic boron nitride sintered body is less than 50% by volume, and the binder phase and inevitable impurities exceed 50% by volume, strength of the cubic boron nitride sintered body is lowered. Therefore, in the processing of a difficult-to-cut material with a low thermal conductivity, fracture resistance of the cubic boron nitride sintered body is lowered. On the other hand, if the cubic boron nitride exceeds 75% by volume, and the binder phase and inevitable impurities are less than 25% by volume, chemical reaction wear is more likely to proceed. By this reason, in the processing of a difficult-to-cut material with low thermal conductivity, fracture resistance of the cubic boron nitride sintered body is lowered.

The binder phase contains an Al compound and a Zr compound. The Al compound contains an Al element, and at least one element selected from the group consisting of N, O and B. The Zr compound contains a Zr element, and at least one element selected from the group consisting of C, N, O and B.

The binder phase may comprise the Al compound and the Zr compound alone, or may contain other compounds. For example, the binder phase may further contain a compound comprising at least one or more elements selected from the group consisting of Ti, Hf, V, Nb, Ta, Cr, Mo, W and Co and at least one or more elements selected from the group consisting of C, N, O and B. However, by using the binder phase comprising the Al compound and the Zr compound alone, chemical reaction wear resistance and toughness of the cubic boron nitride sintered body are improved. Accordingly, the binder phase preferably comprises the Al compound and the Zr compound alone.

As the Al compound, for example, $Al_2O_3$, AlN, $AlB_2$, etc., can be applied. It is preferred that the Al compound comprises $Al_2O_3$ alone. By using the Al compound comprising $Al_2O_3$ alone, fracture due to chemical reaction wear is suppressed.

As the Zr compound, for example, $ZrO_2$, ZrN, ZrCN, $ZrB_2$, etc., can be applied. It is preferred that the Zr compound contains $ZrO_2$ and $ZrB_2$. It is more preferred that $ZrO_2$ contained in the cubic boron nitride sintered body has a crystal structure in the state of tetragonal, or both of tetragonal and cubic being intermixed. According to this constitution, $ZrO_2$ improves toughness of the cubic boron nitride sintered body. As a result, fracture resistance of the cubic boron nitride sintered body is improved. To the cubic boron nitride sintered body of the present embodiment, either of $ZrO_2$ obtained by adding a stabilizer such as $CeO_2$, $Y_2O_3$, MgO, CaO, etc., or $ZrO_2$ obtained by sintering at high temperature and high pressure may be applied. $ZrB_2$ has higher thermal conductivity than that of $ZrO_2$. Accordingly, $ZrB_2$ suppresses chemical reaction wear of the cubic boron nitride sintered body. Further, $ZrB_2$ has high hardness at high temperature. Accordingly, $ZrB_2$ improves wear resistance of the cubic boron nitride sintered body.

Here, when $ZrO_2$ has a crystal structure in the state of tetragonal, or both of tetragonal and cubic being intermixed, the Zr compound preferably satisfies the next conditions with regard to the X-ray diffraction intensity. That is, in the X-ray diffraction, when a peak intensity at a (100) plane of $ZrB_2$ is made $I_1$, a peak intensity of at a (101) plane of tetragonal $ZrO_2$ is made $I_{2t}$, and a peak intensity of at a (111) plane of cubic $ZrO_2$ is made $I_{2c}$, a ratio $[I_1/(I_{2t}+I_{2c})]$ of an intensity of $I_1$ to a sum of intensities of $I_{2t}$ and $I_{2c}$ is 0.5 or more and 5 or less. When $I_1/(I_{2t}+I_{2c})$ is less than 0.5, an amount of $ZrB_2$ is a little, so that wear resistance and fracture resistance of the cubic boron nitride sintered body is lowered in some cases. On the other hand, when $I_1/(I_{2t}+I_{2c})$ exceeds 5, an amount of $ZrO_2$ is relatively little, so that toughness of the cubic boron nitride sintered body is lowered. Accordingly, fracture resistance of the cubic boron nitride sintered body is lowered in some cases.

The sum of the peak intensities of at the (101) plane of the tetragonal $ZrO_2$ and at the (111) plane of the cubic $ZrO_2$ corresponds to a value in which the peak intensity at the (101) plane of the tetragonal $ZrO_2$ and the peak intensity at the (111) plane of the cubic $ZrO_2$ are summed. For example, according to JCPDS card No. 72-2743, a diffraction peak of a diffraction angle 2θ at the (101) plane of the tetragonal $ZrO_2$ exists at around 30.18°. Also, according to JCPDS card No. 49-1642, a diffraction peak of a diffraction angle 2θ at the (111) plane of the cubic $ZrO_2$ exists at around 30.12°. Therefore, the sum of the peak intensities of the (101) plane of the tetragonal $ZrO_2$ and the (111) plane of the cubic $ZrO_2$ corresponds to a value in which the peak intensities of the diffraction peaks at around 30.18° and at around 30.12° are summed. Incidentally, a peak intensity at the (100) plane of the $ZrB_2$ has, for example, according to JCPDS card No. 34-0423, a diffraction angle 2θ existing at around 32.6°.

The X-ray diffraction intensities of the tetragonal $ZrO_2$, the cubic $ZrO_2$ and the $ZrB_2$ are measured by using a commercially available X-ray diffractometer. For the measurement of the X-ray diffraction intensities, for example, an X-ray diffractometer "RINT TTRIII" manufactured by Rigaku Corporation is used. The "RINT TTRIII" is possible to carry out the X-ray diffraction measurement of a 2θ/θ concentrated optical system using a Cu-Kα line. The measurement conditions are made, for example, output: 50 kV and 250 mA, solar slit at incident side: 5°, divergence vertical slit: ½°, divergence vertical limit slit: 10 mm, scattering slit ⅔°, solar slit at photoreception side: 5°, photoreception slit: 0.15 mm, BENT monochromator, photoreception monochrome slit: 0.8 mm, sampling width: 0.02°, scanning speed: 1°/min, and 2θ measurement range: 20 to 50°. By using such a measurement method, the X-ray diffraction intensities can be measured with regard to the diffraction lines at the (101) plane of the tetragonal $ZrO_2$, at the (111) plane of the cubic $ZrO_2$ and at the (100) plane of the $ZrB_2$. From the X-ray diffraction chart obtained by the measurement, the above-mentioned respective peak intensities can be obtained. The respective peak intensities may be obtained by using an analyzing software attached to the X-ray diffractometer. Background removal using cubic approximation and profile fitting using a Pearson-VII function are carried out by the analyzing software to obtain the respective peak intensities.

The cubic boron nitride sintered body of the present embodiment preferably satisfies further the following relation of n/N. That is, at the polished surface of the cubic boron nitride sintered body, when a number of a plurality of line segments drawn radially at equal intervals from a center of gravity of the Zr compound to a boundary of the Zr compound and a portion of a composition other than the Zr compound is made N (provided that N is 8 or more), and among the line segments, at the boundary of the Zr compound and the portion of a composition other than the Zr compound, a number of the line segments contacting with the cubic boron nitride is made n, then a number of the Zr compound satisfying a relation of n/N being 0.25 or more and 0.8 or less is 40% or more based on a total number of the Zr compound. When the relation of n/N is 0.25 or more and 0.8 or less, it shows that the cubic boron nitride and the Zr compound are sufficiently contacted with each other. Thus, heat generated by cutting is dissipated from the Zr compound having a low thermal conductivity through the cubic boron nitride having high thermal conductivity. Therefore, contact of the cubic boron nitride and the Zr compound heightens the thermal dissipation effect of the Zr compound and suppresses increase of the cutting temperature. As a result, chemical reaction wear of the cubic boron nitride sintered body is suppressed. On the other hand, if the number of the Zr compound satisfying the relation of n/N being 0.25 or more and 0.8 or less is less than 40% based on the total number of the Zr compound, the thermal dissipation effect of the Zr compound is insufficient. Therefore, chemical reaction wear of the cubic boron nitride sintered body cannot be suppressed. Also, for effectively dissipating the heat generated by cutting, an average value of the n/N of the whole Zr compound is preferably 0.25 or more and 0.8 or less.

Here, the polished surface of the cubic boron nitride sintered body means a surface obtained by subjecting a surface or an optional cross-section of the cubic boron nitride sintered body to mirror polishing. The method for mirror polishing may be, for example, a method of polishing using a diamond paste.

Figure 1:
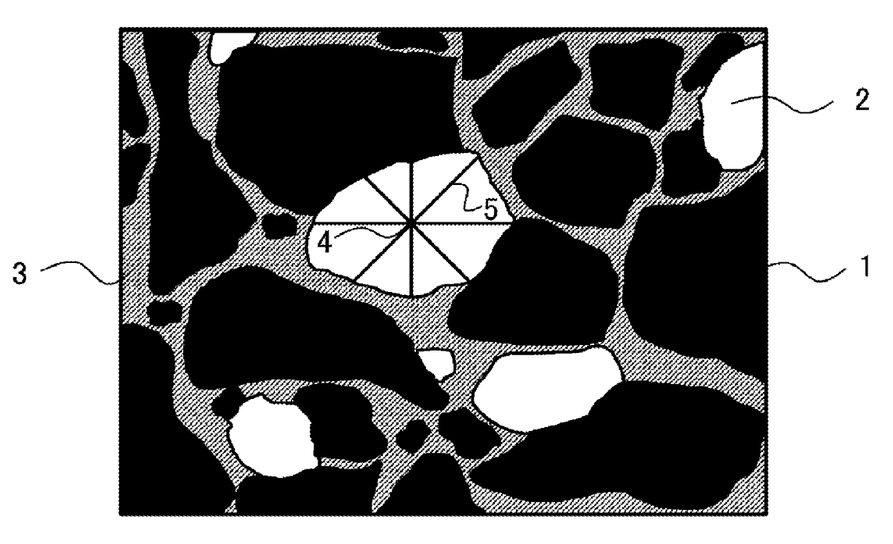
FIG. 1 is a schematic drawing showing the structure of the cubic boron nitride sintered body according to the embodiment of the present invention.

FIG. 1 is a schematic drawing showing the structure of the cubic boron nitride sintered body according to the present embodiment. In the following, a method of obtaining the relation of n/N is explained by referring to FIG. 1. The polished surface of the cubic boron nitride sintered body is observed by, for example, a reflected electron image magnified to 10,000 to 30,000-fold by a scanning electron microscope (SEM). The structure of the cubic boron nitride sintered body is identified by, for example, an energy dispersive X-ray spectrometer (EDS) attached to SEM as the areas of black, gray and white. In FIG. 1, the black area shows the cubic boron nitride (1), the gray area and the white area show the binder phase. Further, the white area shows the Zr compound (2), and the gray area shows the Al compound (3). Thereafter, the structure photograph of the cubic boron nitride sintered body is photographed by the SEM. The structure photograph is preferably so photographed that at least 30 or more of the Zr compounds are contained therein. A center of gravity (4) of the Zr compound shown in FIG. 1 is obtained from the obtained structure photograph using a commercially available image analyzing software. Subsequently, the center of gravity (4) of the Zr compound (2) is specified by an image analyzing software, a plurality of line segments (5) passing through the center of gravity (4) are drawn radially at equal intervals. In the present embodiment, one straight line (5) forms two line segments which reach from the center of gravity (4) of the Zr compound to a portion of a composition other than the Zr compound (2). A number of all the line segments formed by the straight line (5) is made N. The straight line (5) is drawn so that the number N of the line segments is 8 or more. For example, the number N of the line segments shown in FIG. 1 is 8. Thereafter, among the line segments with the number of N, at the boundary of the Zr compound (2) and the portion of the composition other than the Zr compound (2), a number n of the line segments contacting with the cubic boron nitride (1) is measured. From the obtained n and N, a relation of n/N can be obtained. With regard to the other Zr compounds (2) existing in the structure photograph, the relation of n/N can be obtained in the same manner as mentioned above. Thereafter, a number of the Zr compounds (2) satisfying the relation of n/N of 0.25 or more and 0.8 or less is measured. Thereafter, a ratio of the number of the Zr compounds (2) satisfying the relation of n/N being 0.25 or more and 0.8 or less based on the total number of the Zr compounds (2) is obtained. Based on the values of n/N of the obtained respective Zr compounds (2), an average value of n/N of the whole Zr compounds (2) is obtained.

The Zr compound contained in the cubic boron nitride sintered body is preferably 1% by volume or more and 4% by volume or less. If the Zr compound contained in the cubic boron nitride sintered body is less than 1% by volume, toughness of the cubic boron nitride sintered body is lowered. According to this, fracture resistance of the cubic boron nitride sintered body is lowered in some cases. If the Zr compound contained in the cubic boron nitride sintered body exceeds 4% by volume, thermal conductivity of the cubic boron nitride sintered body is lowered. Accordingly, chemical reaction wear of the cubic boron nitride sintered body becomes an origin to cause fracture in some cases.

An average grain size of the cubic boron nitride is preferably 0.2 μm or more and 0.8 μm or less. If the average grain size of the cubic boron nitride is less than 0.2 μm, the cubic boron nitride is agglomerated. Accordingly, the structure of the sintered body becomes non-uniform, and fracture resistance of the cubic boron nitride sintered body is lowered in some cases. On the other hand, the average grain size of the cubic boron nitride exceeds 0.8 µm, contact efficiency with the Zr compound is lowered. Accordingly, the thermal dissipation effect of the cubic boron nitride sintered body is difficulty obtained, and wear resistance is lowered in some cases. More preferred average grain size of the cubic boron nitride is 0.2 µm or more and 0.6 µm or less.

Impurities inevitably contained in the cubic boron nitride sintered body are, for example, lithium, etc., contained in the raw powder, etc. In general, a total amount of the inevitable impurities can be suppressed to 1% by mass or less based on the whole cubic boron nitride sintered body. Therefore, the total amount of the inevitable impurities does not affect to the characteristic value of the present invention.

% by volume of the cubic boron nitride, the binder phase and the Zr compound, and the average grain size of the cubic boron nitride can be obtained by analyzing the structure photograph of the cubic boron nitride sintered body photographed by the SEM using a commercially available image analyzing software. The structure photograph of the cubic boron nitride sintered body can be obtained by the same method using the SEM as mentioned above. The respective occupied areas of the cubic boron nitride, the binder phase and the Zr compound can be obtained by the image analyzing software from the obtained structure photograph. The values of the respective occupied areas correspond to the respective volume contents of the cubic boron nitride, the binder phase and the Zr compound. Also, the composition of the binder phase can be identified by an X-ray diffractometer.

The cubic boron nitride sintered body of the present embodiment is preferably a coated cubic boron nitride sintered body in which a film is formed thereon. The film more improves wear resistance of the cubic boron nitride sintered body.

The film is not particularly limited as long as it is used as a film of a coated tool. The film preferably comprises a layer of a compound containing the first element and the second element. The film is preferably a monolayer or a laminated layer containing a plural number of layers. The first element is preferably at least one element selected from the group consisting of Ti, Zr, Hf, V, Nb, Ta, Cr, Mo, W, Y, Al and Si. The second element is preferably at least one element selected from the group consisting of C, N, O and B. The film having such a constitution improves wear resistance of the coated tool to which the coated cubic boron nitride sintered body of the present embodiment has been applied.

Examples of the film may be TiN, TiC, TiCN, TiAlN, TiSiN and CrAlN, etc. The film may be either of a monolayer or a laminated layer containing two or more layers. The film preferably has a structure in which a plural number of layers with different compositions are laminated alternately. An average film thickness of the respective layers is preferably 5 nm or more and 500 nm or less.

The average layer thickness of the whole film is preferably 0.5 µm or more and 20 µm or less. If the average film thickness of the whole film is less than 0.5 µm, wear resistance of the coated tool is lowered. If the average film thickness of the whole film exceeds 20 µm, fracture resistance of the coated tool is lowered.

A film thickness of the respective films constituting the film can be obtained, for example, by measuring the cross-sectional structure of the coated cubic boron nitride sintered body using an optical microscope, SEM, a transmission electron microscope (TEM), etc. Incidentally, the average layer thickness of the respective films constituting the film can be obtained, for example, by measuring a film thickness of the respective layers and a thickness of the respective laminated structures from three or more cross-sections from the blade edge of the surface opposing to a metal evaporation source to the neighbor of the position at 50 µm toward the center portion of the surface, and an average of the obtained values is calculated.

Also, the composition of the respective films constituting the film can be obtained, for example, by measuring the cross-sectional structure of the coated cubic boron nitride sintered body using the EDS or a wavelength dispersive X-ray spectrometry (WDS), etc.

A process for producing the film in the coated cubic boron nitride sintered body of the present invention is not particularly limited. For example, a physical deposition method such as an ion plating method, an arc ion plating method, a sputtering method and an ion mixing method, etc. may be applied as a process for producing the film. Among these, the arc ion plating method is more preferred since adhesiveness between the film and the substrate is improved.

The process for producing the cubic boron nitride sintered body of the present embodiment contains, for example, the following Processes (A) to (K).

Process (A): 30 to 70% by volume of the cubic boron nitride having an average particle size of 0.2 to 0.8 µm, and 30 to 70% by volume of at least one kind of powder selected from the group consisting of a carbide, a nitride, a carbonitride, an oxide and a boride of a Zr element having an average particle size of 0.4 to 0.8 µm are mixed (provided that the sum of these is 100% by volume).

Process (B): The raw powder prepared in Process (A) is mixed by a wet ball mill equipped with balls made of $ZrO_2$ for 5 to 48 hours.

Process (C): The mixture obtained in Process (B) is molded to a predetermined shape and temporary sintered.

Process (D): The molded body obtained in Process (C) is charged in an ultra-high pressure generating device, and sintered by maintaining at a pressure of 5.0 to 6.5 GPa and a sintering temperature in the range of 1200 to 1400° C. for 30 minutes.

Process (E): The composite obtained in Process (D) is pulverized in a mortar made of cemented carbide to prepare composite powder.

Process (F): The composite powder obtained in Process (E) is pulverized by a wet ball mill equipped with balls made of cemented carbide for 24 to 96 hours to make the composite powder finer particles.

Process (G): The composite powder subjected to Process (F) is subjected to separation by the specific gravity, thereafter, to the acid treatment whereby the component derived from cemented carbide is removed.

Process (H): 2 to 14% by volume of the composite powder subjected to Process (G), 50 to 75% by volume of the cubic boron nitride having an average particle size of 0.2 to 0.8 jam, 11 to 46% by volume of at least one kind of powder selected from the group consisting of a nitride, an oxide and a boride of an Al element having an average particle size of 0.05 to 3.0 µm, and 3 to 13% by volume of an Al powder having an average particle size of 0.5 to 5.0 µm are mixed (provided that the sum of these is 100% by volume).

Process (I): The raw powder prepared in Process (H) is mixed by a wet ball mill equipped with balls made of $Al_2O_3$ for 5 to 24 hours.

Process (J): The mixture obtained in Process (I) is molded to a predetermined shape.

Process (K): The molded body obtained in Process (J) is charged in an ultra-high pressure generating device, and sintered by maintaining at a pressure of 4.5 to 6.0 GPa and a sintering temperature in the range of 1300 to 1500° C. for a predetermined time.

The respective Processes of the above-mentioned producing process have the following meanings.

In Process (A), cubic boron nitride powder, and at least one kind of powder selected from the group consisting of a carbide, a nitride, a carbonitride, an oxide and a boride of the Zr element are used. Accordingly, composite powder in which the cubic boron nitride and the Zr compound are contacted with each other at the grain boundary is produced. Also, in Process (A), the particle size of the cubic boron nitride can be adjusted. In particular, when $ZrO_2$ powder to which a stabilizer such as $CeO_2$, $Y_2O_3$, MgO, CaO, etc., had been added is used, tetragonal or cubic body excellent in toughness is formed. If the average particle size of the primary particles of the $ZrO_2$ powder is 30 to 50 nm, there is an effect that fine $ZrO_2$ is easily dispersed in the structure of the cubic boron nitride sintered body. However, in view of easiness in handling, $ZrO_2$ powder which is secondary particles having an average particle size of 0.1 to 2 μm in which primary particles of the $ZrO_2$ having an average particle size of 30 to 50 nm had been agglomerated is preferably used.

In Process (B), agglomeration of the cubic boron nitride or the Zr compound prepared in Process (A) is prevented, and the raw powder is uniformly mixed.

In Process (C), the mixture obtained in Process (B) is molded to a predetermined shape and temporary sintered. The obtained molded body is sintered in the next sintering process.

In Process (D), the molded body obtained in Process (C) is sintered so that a composite body in which the cubic boron nitride and the Zr compound are contacted is produced.

In Process (E) and Process (F), the composite body obtained in Process (D) is pulverized to a composite powder having a smaller granularity.

In Process (G), the cemented carbide is removed from the composite powder subjected to Process (E) and (F), so that purity of the composite powder becomes high.

In Process (H), the composition and the grain size of the cubic boron nitride sintered body are adjusted.

In Process (I), the mixed powder with a predetermined composition obtained in Process (H) is uniformly mixed.

In Process (J), the mixture obtained in Process (I) is molded to a predetermined shape. The obtained molded body is sintered in the next Process (K).

In Process (K), the molded body obtained in Process (J) is sintered at a pressure of 4.5 to 6.0 GPa and a temperature in the range of 1300 to 1500° C. to produce a cubic boron nitride sintered body. Also, in Process (D), the composite powder in which the cubic boron nitride and the Zr compound are contacted is used, so that during sintering of Process (K), the cubic boron nitride and the Zr compound are reacted, and the $ZrB_2$ contacting with the cubic boron nitride is more efficiently formed.

Grinding processing or honing processing of the blade edge may be applied to the cubic boron nitride sintered body obtained through Processes (A) to (K) depending on necessity.

The cubic boron nitride sintered body and the coated cubic boron nitride sintered body of the present embodiment are excellent in wear resistance and fracture resistance. Accordingly, a cutting tool and a wear resistant tool to which the cubic boron nitride sintered body and the coated cubic boron nitride sintered body of the present embodiment have been applied are elongated in the tool life. In particular, the cubic boron nitride sintered body and coated cubic boron nitride sintered body of the embodiment are preferably applied to a cutting tool.

Example 1

By using cubic boron nitride (cBN) powders each having an average particle size of 0.2, 0.4, 0.8, 1.8 and 3.8 μm, and $ZrO_2$ (PSZ) powder to which 3 mol % of $Y_2O_3$ had been added to the whole $ZrO_2$ and having an average particle size of 0.6 μm in which $ZrO_2$ particles which are primary particles having an average particle size of 40 nm had been agglomerated, these powders were mixed to the composition shown in Table 1. In addition, the average particle size of the mixed cBN is shown in Table 1. With regard to Comparative products 7 to 10, composite powder was not produced.

TABLE 1

| Sample No. | Composition (% by volume) | | Average particle size of cBN (μm) |
|---|---|---|---|
| | cBN | PSZ | |
| Present product 1 | 70 | 30 | 0.4 |
| Present product 2 | 70 | 30 | 0.4 |
| Present product 3 | 70 | 30 | 0.4 |
| Present product 4 | 70 | 30 | 0.4 |
| Present product 5 | 70 | 30 | 0.4 |
| Present product 6 | 70 | 30 | 0.4 |
| Present product 7 | 70 | 30 | 0.2 |
| Present product 8 | 70 | 30 | 0.8 |
| Present product 9 | 70 | 30 | 0.4 |
| Present product 10 | 70 | 30 | 0.4 |
| Present product 11 | 50 | 50 | 0.4 |
| Present product 12 | 30 | 70 | 0.4 |
| Comparative product 1 | 70 | 30 | 1.8 |
| Comparative product 2 | 70 | 30 | 3.8 |
| Comparative product 3 | 70 | 30 | 0.4 |
| Comparative product 4 | 70 | 30 | 0.4 |
| Comparative product 5 | 70 | 30 | 0.4 |
| Comparative product 6 | 70 | 30 | 0.4 |
| Comparative product 7 | Not mixed | | |
| Comparative product 8 | Not mixed | | |
| Comparative product 9 | Not mixed | | |
| Comparative product 10 | Not mixed | | |

The mixed raw powders were charged in a cylinder for ball mill with balls made of $ZrO_2$ and a hexane solvent, and ball mill mixing was carried out for 12 hours. The mixed powders obtained by mixing with the ball mill was subjected to compacting, and then, to temporary sintering under the conditions of $1.33 \times 10^{-3}$ Pa at 750° C. These temporary sintered bodies were each charged in an ultra-high pressure and high temperature generating device, and sintered with the conditions at a pressure of 6.0 GPa, a temperature of 1300° and a retention time of 30 minutes to obtain the respective sintered bodies.

The obtained respective sintered bodies were pulverized by a mortar made of cemented carbide to produce respective composite powders. Thereafter, the respective composite powders were each charged in a cylinder for ball mill with balls made of cemented carbide and a hexane solvent and subjected to ball mill pulverization for 48 hours.

Moreover, the obtained respective composite mixtures were each separated by specific gravity. Thereafter, these were subjected to an acid treatment to remove the cemented carbide mixed in the respective composite mixtures.

The composite powders obtained by the above Processes, the cBN powder having an average particle size of 0.2, 0.4, 0.8, 1.8 and 3.8 μm, the PSZ powder having an average particle size of 0.6 μm, the ZrC powder having an average particle size of 0.6 μm, the ZrN powder having an average particle size of 0.6 μm, the TiN powder having an average particle size of 0.4 μm, the $Al_2O_3$ powder having an average particle size of 0.1 μm, and the Al powder having an average particle size of 4.0 μm were mixed to the composition as shown in Table 2. Also, the average particle size of the mixed cBN is shown in Table 2.

TABLE 2

| Sample No. | Composite body powder (% by volume) | cBN (% by volume) | $Al_2O_3$ (% by volume) | Al (% by volume) | PSZ (% by volume) | Other compounds Composition | Other compounds (% by volume) | Average particle size of cBN (μm) |
|---|---|---|---|---|---|---|---|---|
| Present product 1 | 13.1 | 40.8 | 42.6 | 3.5 | 0.0 | — | 0.0 | 0.4 |
| Present product 2 | 4.5 | 46.9 | 45.1 | 3.5 | 0.0 | — | 0.0 | 0.4 |
| Present product 3 | 6.3 | 60.6 | 29.6 | 3.5 | 0.0 | — | 0.0 | 0.4 |
| Present product 4 | 6.3 | 60.6 | 28.4 | 3.5 | 0.0 | ZrC | 1.2 | 0.4 |
| Present product 5 | 6.3 | 60.6 | 28.4 | 3.5 | 0.0 | ZrN | 1.2 | 0.4 |
| Present product 6 | 12.2 | 56.4 | 23.4 | 8.0 | 0.0 | — | 0.0 | 0.4 |
| Present product 7 | 6.3 | 60.6 | 29.6 | 3.5 | 0.0 | — | 0.0 | 0.2 |
| Present product 8 | 6.3 | 60.6 | 29.6 | 3.5 | 0.0 | — | 0.0 | 0.8 |
| Present product 9 | 13.1 | 65.8 | 17.6 | 3.5 | 0.0 | — | 0.0 | 0.4 |
| Present product 10 | 3.6 | 72.5 | 11.9 | 12.0 | 0.0 | — | 0.0 | 0.4 |
| Present product 11 | 3.8 | 63.1 | 29.6 | 3.5 | 0.0 | — | 0.0 | 0.4 |
| Present product 12 | 2.7 | 64.2 | 29.6 | 3.5 | 0.0 | — | 0.0 | 0.4 |
| Comparative product 1 | 6.3 | 60.6 | 29.6 | 3.5 | 0.0 | — | 0.0 | 1.8 |
| Comparative product 2 | 6.3 | 60.6 | 29.6 | 3.5 | 0.0 | — | 0.0 | 3.8 |
| Comparative product 3 | 2.0 | 63.6 | 30.9 | 3.5 | 0.0 | — | 0.0 | 0.4 |
| Comparative product 4 | 20.0 | 51.0 | 25.5 | 3.5 | 0.0 | — | 0.0 | 0.4 |
| Comparative product 5 | 12.7 | 26.1 | 57.7 | 3.5 | 0.0 | — | 0.0 | 0.4 |
| Comparative product 6 | 4.0 | 82.2 | 10.3 | 3.5 | 0.0 | — | 0.0 | 0.4 |
| Comparative product 7 | 0.0 | 65.0 | 29.6 | 3.5 | 1.9 | — | 0.0 | 0.4 |
| Comparative product 8 | 0.0 | 65.0 | 31.5 | 3.5 | 0.0 | — | 0.0 | 0.4 |
| Comparative product 9 | 0.0 | 65.0 | 0.0 | 3.5 | 31.5 | — | 0.0 | 0.4 |
| Comparative product 10 | 0.0 | 65.0 | 0.0 | 10.0 | 0.0 | TiN | 25.0 | 0.8 |

The mixed raw powders were charged in a cylinder for ball mill with balls made of $Al_2O_3$ and a hexane solvent, and subjected to ball mill mixing. The mixed powders obtained by subjecting to ball mill mixing were subjected to compacting, and then, to temporary sintering under the conditions of $1.33 \times 10^{-3}$ Pa at 750° C. These temporary sintered bodies were charged in an ultra-high pressure and high temperature generating device, and sintered under the conditions shown in Table 3 to obtain cubic boron nitride sintered bodies of Present products and Comparative products.

TABLE 3

| Sample No. | Sintering temperature (° C.) | Sintering pressure (GPa) |
|---|---|---|
| Present product 1 | 1300 | 5.5 |
| Present product 2 | 1400 | 4.5 |

TABLE 3-continued

| Sample No. | Sintering temperature (° C.) | Sintering pressure (GPa) |
|---|---|---|
| Present product 3 | 1400 | 5.5 |
| Present product 4 | 1400 | 5.5 |
| Present product 5 | 1400 | 5.5 |
| Present product 6 | 1500 | 6.0 |
| Present product 7 | 1500 | 6.0 |
| Present product 8 | 1400 | 5.5 |
| Present product 9 | 1400 | 5.5 |
| Present product 10 | 1450 | 6.0 |
| Present product 11 | 1400 | 5.5 |

TABLE 3-continued

| Sample No. | Sintering temperature (° C.) | Sintering pressure (GPa) |
|---|---|---|
| Present product 12 | 1400 | 5.5 |
| Comparative product 1 | 1400 | 4.5 |
| Comparative product 2 | 1400 | 5.5 |
| Comparative product 3 | 1400 | 6.0 |
| Comparative product 4 | 1300 | 5.5 |
| Comparative product 5 | 1400 | 5.5 |
| Comparative product 6 | 1500 | 5.5 |
| Comparative product 7 | 1400 | 5.5 |
| Comparative product 8 | 1400 | 5.5 |
| Comparative product 9 | 1500 | 4.5 |
| Comparative product 10 | 1300 | 4.0 |

The thus obtained cubic boron nitride sintered bodies were subjected to X-ray diffraction measurement to examine the composition of the respective cubic boron nitride sintered bodies. Also, the cross-sectional structures of the cubic boron nitride sintered bodies were photographed by SEM, and % by volume of the cBN, % by volume of the binder phase and % by volume of the Zr compound were measured by analyzing the cross-sectional structure photographs using commercially available image analyzing software. These results are shown in Table 4.

TABLE 4

| | Cubic boron nitride sintered body | | | | | |
|---|---|---|---|---|---|---|
| | cBN | Whole binder phase | Content of binder phase | | | |
| | | | | Zr compound | | Other |
| Sample No. | (% by volume) | (% by volume) | Al compound Composition | Composition | (% by volume) | compounds Composition |
| Present product 1 | 50 | 50 | $Al_2O_3$ | $ZrO_2$, $ZrB_2$ | 3.9 | — |
| Present product 2 | 50 | 50 | $Al_2O_3$ | $ZrO_2$, $ZrB_2$ | 1.3 | — |
| Present product 3 | 65 | 35 | $Al_2O_3$ | $ZrO_2$, $ZrB_2$ | 1.9 | — |
| Present product 4 | 65 | 35 | $Al_2O_3$ | $ZrO_2$, $ZrB_2$, ZrC | 3.1 | — |
| Present product 5 | 65 | 35 | $Al_2O_3$ | $ZrO_2$, $ZrB_2$, ZrN | 3.1 | — |
| Present product 6 | 65 | 35 | $Al_2O_3$, AlN, $AlB_2$ | $ZrO_2$, $ZrB_2$ | 3.7 | — |
| Present product 7 | 65 | 35 | $Al_2O_3$ | $ZrO_2$, $ZrB_2$ | 1.9 | — |
| Present product 8 | 65 | 35 | $Al_2O_3$ | $ZrO_2$, $ZrB_2$ | 1.9 | — |
| Present product 9 | 75 | 25 | $Al_2O_3$ | $ZrO_2$, $ZrB_2$ | 3.9 | — |
| Present product 10 | 75 | 25 | $Al_2O_3$, AlN, $AlB_2$ | $ZrO_2$, $ZrB_2$ | 1.1 | — |
| Present product 11 | 65 | 35 | $Al_2O_3$ | $ZrO_2$, $ZrB_2$ | 1.9 | — |
| Present product 12 | 65 | 35 | $Al_2O_3$ | $ZrO_2$, $ZrB_2$ | 1.9 | — |
| Comparative product 1 | 65 | 35 | $Al_2O_3$ | $ZrO_2$, $ZrB_2$ | 1.9 | — |
| Comparative product 2 | 65 | 35 | $Al_2O_3$ | $ZrO_2$, $ZrB_2$ | 1.9 | — |
| Comparative product 3 | 65 | 35 | $Al_2O_3$ | $ZrO_2$, $ZrB_2$ | 0.6 | — |
| Comparative product 4 | 65 | 35 | $Al_2O_3$ | $ZrO_2$, $ZrB_2$ | 6.0 | — |
| Comparative product 5 | 35 | 65 | $Al_2O_3$ | $ZrO_2$, $ZrB_2$ | 3.8 | — |
| Comparative product 6 | 85 | 15 | $Al_2O_3$ | $ZrO_2$, $ZrB_2$ | 1.2 | — |
| Comparative product 7 | 65 | 35 | $Al_2O_3$ | $ZrO_2$, $ZrB_2$ | 1.9 | — |
| Comparative product 8 | 65 | 35 | $Al_2O_3$ | — | 0.0 | — |
| Comparative product 9 | 65 | 35 | $Al_2O_3$ | $ZrO_2$, $ZrB_2$ | 31.5 | — |
| Comparative product 10 | 65 | 35 | AlN, $AlB_2$ | — | 0.0 | TiN |

For measuring peak heights of the diffraction lines with regard to the obtained cubic boron nitride sintered bodies, X-ray diffraction measurement of 2θ/θ concentrated optical system using a Cu-Kα line and an X-ray diffractometer RINT TTRIII manufactured by Rigaku Corporation was carried out under the conditions of output: 50 kV and 250 mA, solar slit at incident side: 5°, divergence vertical slit: ½°, divergence vertical limit slit: 10 mm, scattering slit ⅔°, solar slit at photoreception side: 5°, photoreception slit: 0.15 mm, BENT monochromator, photoreception monochrome slit: 0.8 mm, sampling width: 0.02°, scanning speed: 1°/min, and 2θ measurement range: 20 to 50°. From the obtained X-ray diffraction chart, an X-ray diffraction intensity $I_1$ at the (100) plane of the $ZrB_2$, an X-ray diffraction intensity $I_{2t}$ at the (101) plane of the tetragonal $ZrO_2$, and an X-ray diffraction intensity $I_{2c}$ at the (111) plane of the cubic $ZrO_2$ were measured, and a ratio $[I_1/(I_{2t}+I_{2c})]$ of the peak intensity of $I_1$ based on the sum of the peak intensities of $I_{2t}$ and $I_{2c}$ was obtained. These values are shown in Table 5.

TABLE 5

| Sample No. | $I_1/(I_{2t} + I_{2c})$ |
| --- | --- |
| Present product 1 | 1.90 |
| Present product 2 | 1.53 |
| Present product 3 | 2.34 |
| Present product 4 | 2.16 |
| Present product 5 | 2.20 |
| Present product 6 | 4.27 |
| Present product 7 | 2.65 |
| Present product 8 | 2.10 |
| Present product 9 | 3.03 |
| Present product 10 | 4.91 |
| Present product 11 | 2.24 |
| Present product 12 | 2.18 |
| Comparative product 1 | 1.35 |
| Comparative product 2 | 1.56 |
| Comparative product 3 | 8.80 |
| Comparative product 4 | 0.36 |
| Comparative product 5 | 0.18 |
| Comparative product 6 | 3.82 |
| Comparative product 7 | 1.14 |
| Comparative product 8 | 0.00 |
| Comparative product 9 | 0.03 |
| Comparative product 10 | 0.00 |

The average grain size of the cubic boron nitride of the cubic boron nitride sintered body was obtained from the cross-sectional structure photograph photographed by the SEM using a commercially available image analyzing software. More specifically, 5,000-fold of the reflected electron image was observed by using the SEM, and by using EDS attached to the SEM, and it is confirmed that the cubic boron nitride was black, the Al compound was grey and the Zr compound was white, and an image was photographed. Next, by using a commercially available image analyzing software, a diameter of a circle an area of which was equal to the area of the black cubic boron nitride was obtained. The obtained diameter corresponds to the grain diameter of the cubic boron nitride, and an average value thereof was obtained from the grain diameters of the cubic boron nitride existing in the cross-sectional structure. The obtained value is shown in Table 6.

TABLE 6

| Sample No. | Average grain diameter of cBN (μm) |
| --- | --- |
| Present product 1 | 0.4 |
| Present product 2 | 0.4 |
| Present product 3 | 0.4 |

TABLE 6-continued

| Sample No. | Average grain diameter of cBN (μm) |
| --- | --- |
| Present product 4 | 0.4 |
| Present product 5 | 0.4 |
| Present product 6 | 0.4 |
| Present product 7 | 0.2 |
| Present product 8 | 0.8 |
| Present product 9 | 0.4 |
| Present product 10 | 0.4 |
| Present product 11 | 0.4 |
| Present product 12 | 0.4 |
| Comparative product 1 | 1.8 |
| Comparative product 2 | 3.8 |
| Comparative product 3 | 0.4 |
| Comparative product 4 | 0.4 |
| Comparative product 5 | 0.4 |
| Comparative product 6 | 0.4 |
| Comparative product 7 | 0.4 |
| Comparative product 8 | 0.4 |
| Comparative product 9 | 0.4 |
| Comparative product 10 | 0.8 |

The surfaces of the obtained cubic boron nitride sintered bodies were subjected to mirror polishing, and the polished surfaces of the cubic boron nitride sintered bodies magnified to 10,000-fold to 30,000-fold by using the SEM were observed by reflected electron images, and structure photographs were photographed. At this time, magnification was optionally changed so that at least 30 or more of the Zr compounds were contained, and the structure photographs were photographed. From the obtained structure photographs, the center of gravity of the Zr compound was obtained by using a commercially available image analyzing software, and 8 straight lines were drawn radially at equal intervals from the center of gravity of the Zr compound to the portion of the composition other than the Zr compound. Thereafter, a number n of the line segments at which the cubic boron nitride and the Zr compound were contacted was measured, and a relation of n/N was obtained from the measurement results. Similarly, the relation of n/N was obtained with regard to the whole Zr compound, and from the obtained results, an average value of n/N of the whole Zr compounds and a ratio of the number of the Zr compounds satisfying the relation of n/N were obtained. These results are shown in Table 7.

TABLE 7

| Sample No. | Average value of n/N of whole Zr compound | Ratio of number of Zr compound satisfying relation of n/N (%) |
| --- | --- | --- |
| Present product 1 | 0.43 | 45 |
| Present product 2 | 0.25 | 41 |
| Present product 3 | 0.34 | 62 |
| Present product 4 | 0.36 | 52 |
| Present product 5 | 0.33 | 50 |
| Present product 6 | 0.30 | 53 |
| Present product 7 | 0.51 | 56 |
| Present product 8 | 0.27 | 47 |
| Present product 9 | 0.78 | 66 |
| Present product 10 | 0.52 | 60 |
| Present product 11 | 0.33 | 53 |
| Present product 12 | 0.31 | 49 |
| Comparative product 1 | 0.07 | 20 |
| Comparative product 2 | 0.02 | 6 |
| Comparative product 3 | 0.32 | 63 |
| Comparative product 4 | 0.38 | 65 |
| Comparative product 5 | 0.16 | 31 |

TABLE 7-continued

| Sample No. | Average value of n/N of whole Zr compound | Ratio of number of Zr compound satisfying relation of n/N (%) |
|---|---|---|
| Comparative product 6 | 0.76 | 60 |
| Comparative product 7 | 0.04 | 28 |
| Comparative product 8 | 0.00 | 0 |
| Comparative product 9 | 0.98 | 0 |
| Comparative product 10 | 0.00 | 0 |

Present products and Comparative products were processed to a cutting tool having an ISO standard CNGA120408 insert shape. With regard to the obtained cutting tools, the following cutting test was carried out. The results are shown in Table 8.

[Cutting Test]
External continuous cutting (turning),
work piece material: Inconel 718,
shape of work piece material: cylindrical φ120 mm×350 mm,
cutting speed: 300 m/min,
depth of cut: 0.2 mm,
feed: 0.2 mm/rev,
coolant: wet,
evaluation item: when the sample was fractured or the maximum flank wear width of which reached to 0.2 mm, it was judged as the tool life, and the cutting time until reaching to the tool life was measured.

TABLE 8

| | Cutting test | |
|---|---|---|
| Sample No. | Tool life (min) | Tool damaged form |
| Present product 1 | 8.2 | Normal wear |
| Present product 2 | 8.6 | Normal wear |
| Present product 3 | 9.0 | Normal wear |
| Present product 4 | 8.6 | Normal wear |
| Present product 5 | 8.2 | Normal wear |
| Present product 6 | 7.9 | Normal wear |
| Present product 7 | 9.2 | Normal wear |
| Present product 8 | 8.3 | Normal wear |
| Present product 9 | 8.8 | Normal wear |
| Present product 10 | 8.1 | Normal wear |
| Present product 11 | 8.8 | Normal wear |
| Present product 12 | 8.9 | Normal wear |
| Comparative product 1 | 5.0 | Fracture |
| Comparative product 2 | 4.3 | Fracture |
| Comparative product 3 | 5.2 | Fracture |
| Comparative product 4 | 6.4 | Normal wear |
| Comparative product 5 | 4.5 | Fracture |
| Comparative product 6 | 2.8 | Fracture |
| Comparative product 7 | 5.0 | Fracture |
| Comparative product 8 | 3.3 | Fracture |
| Comparative product 9 | 1.4 | Fracture |
| Comparative product 10 | 2.9 | Fracture |

The cubic boron nitride sintered bodies of Present products were suppressed in progress of chemical reaction wear at the time of cutting as compared to those of the cubic boron nitride sintered bodies of Comparative products, so that fracture resistance was improved whereby their tool life was elongated as compared to those of Comparative products.

Example 2

A coating treatment was carried out onto the surface of Present products 1 to 12 of Example 1 by using a PVD device. Those in which a TiN layer having an average layer thickness of 3 μm had been coated onto the surface of the cubic boron nitride sintered bodies of Present products 1 to 4 were made Present products 13 to 16, and those in which a TiAlN layer having an average layer thickness of 3 μm had been coated onto the surface of the cubic boron nitride sintered bodies of Present products 5 to 8 were made Present products 17 to 20. Those in which alternate lamination of TiAlN with 3 nm per a layer and TiAlNbWN with 3 nm per a layer being alternately laminated with each 500 layers had been coated onto the surface of the cubic boron nitride sintered bodies of Present products 9 to 12 were made Present products 21 to 24. With regard to Present products 13 to 24, the same cutting test as in Example 1 was carried out. The results are shown in Table 9.

TABLE 9

| | Cutting test | |
|---|---|---|
| Sample No. | Tool life (min) | Tool damaged form |
| Present product 13 | 10.3 | Normal wear |
| Present product 14 | 10.8 | Normal wear |
| Present product 15 | 11.3 | Normal wear |
| Present product 16 | 10.7 | Normal wear |
| Present product 17 | 10.5 | Normal wear |
| Present product 18 | 10.5 | Normal wear |
| Present product 19 | 11.4 | Normal wear |
| Present product 20 | 10.2 | Normal wear |
| Present product 21 | 10.9 | Normal wear |
| Present product 22 | 10.4 | Normal wear |
| Present product 23 | 11.2 | Normal wear |
| Present product 24 | 11.1 | Normal wear |

All of Present products 13 to 24 which had been covered by a coating layer could be further elongated in their tool lives than those of Present products 1 to 12 which had not been covered by a coating layer.

INDUSTRIAL APPLICABILITY

The cubic boron nitride sintered body and the coated cubic boron nitride sintered body of the present invention is excellent in fracture resistance, in particular, a tool life can be extended when these are used as a cutting tool or a wear resistant tool, so that their industrial applicability is high.

EXPLANATION OF THE REFERENCE NUMERALS

1: Cubic boron nitride
2: Zr compound
3: Al compound
4: Center of gravity of Zr compound
5: Line segments from center of gravity of Zr compound to portion of composition other than Zr compound

The invention claimed is:

1. A cubic boron nitride sintered body which comprises 50% by volume or more and 75% by volume or less of a cubic boron nitride, and 25% by volume or more and 50% by volume or less of a binder phase and inevitable impurities, wherein,
the binder phase contains an Al compound and a Zr compound,
the Al compound contains an Al element, and at least one element selected from the group consisting of N, O and B,
the Zr compound contains a Zr element, and at least one element selected from the group consisting of C, N, O and B, and at a polished surface of the cubic boron nitride sintered body, when a number of a plurality of line segments drawn radially at equal intervals from a center of gravity of the Zr compound to a boundary of the Zr compound and a portion of a composition other than the Zr compound is made N (provided that N is 8 or more), and among the line segments, at the boundary of the Zr compound and the portion of a composition other than the Zr compound, a number of the line segments contacting with the cubic boron nitride is made n, then a number of the Zr compound satisfying a relation of n/N being 0.25 or more and 0.8 or less is 40% or more based on a total number of the Zr compound.

2. The cubic boron nitride sintered body according to claim 1, wherein the Zr compound is 1% by volume or more and 4% by volume or less based on the whole cubic boron nitride sintered body.

3. The cubic boron nitride sintered body according to claim 1, wherein an average grain size of the cubic boron nitride is 0.2 μm or more and 0.8 μm or less.

4. The cubic boron nitride sintered body according claim 1, wherein the Zr compound contains $ZrB_2$ and $ZrO_2$, a crystal structure of the $ZrO_2$ is formed in a state of tetragonal, or both of tetragonal and cubic being intermixed, when a peak intensity at a (100) plane of the $ZrB_2$ is made $I_1$, a peak intensity at a (101) plane of the tetragonal $ZrO_2$ is made $I_{2t}$, and a peak intensity at a (111) plane of the cubic $ZrO_2$ is made $I_{2c}$ in X-ray diffraction, a ratio $[I_1/(I_{2t}+I_{2c})]$ of an intensity of $I_1$ based on a sum of intensities of $I_{2t}$ and $I_{2c}$ is 0.5 or more and 5 or less.

5. The cubic boron nitride sintered body according to claim 1, wherein the Al compound comprises $Al_2O_3$.

6. A coated cubic boron nitride sintered body which comprises a film formed onto a surface of the cubic boron nitride sintered body of claim 1.

7. The coated cubic boron nitride sintered body according to claim 6, wherein the film comprises at least one or more elements selected from the group consisting of Ti, Zr, Hf, V, Nb, Ta, Cr, Mo, W, Al and Si, and at least one or more elements selected from the group consisting of C, N, O and B.

8. The coated cubic boron nitride sintered body according to claim 6, wherein the film is a monolayer film or a laminated film of two or more layers.

9. The coated cubic boron nitride sintered body according to claim 6, wherein an average film thickness of a whole film is 0.5 μm or more and 20 μm or less.

* * * * *